United States Patent
Sofra et al.

(10) Patent No.: US 10,814,872 B2
(45) Date of Patent: Oct. 27, 2020

(54) METHOD FOR PROVIDING TRACK INFORMATION ON A VEHICLE TRACK, AND SYSTEM

(71) Applicant: AUDI AG, Ingolstadt (DE)

(72) Inventors: Nikoletta Sofra, Ingolstadt (DE); Artur Burczyk, Ingolstadt (DE); Simon Rührschneck, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 218 days.

(21) Appl. No.: 15/775,691

(22) PCT Filed: Nov. 9, 2016

(86) PCT No.: PCT/EP2016/077034
§ 371 (c)(1),
(2) Date: May 11, 2018

(87) PCT Pub. No.: WO2017/081035
PCT Pub. Date: May 18, 2017

(65) Prior Publication Data
US 2018/0370533 A1    Dec. 27, 2018

(30) Foreign Application Priority Data
Nov. 12, 2015   (DE) .......................... 10 2015 014 651

(51) Int. Cl.
*B60W 30/10* (2006.01)
*H04W 4/44* (2018.01)
(Continued)

(52) U.S. Cl.
CPC ........... *B60W 30/10* (2013.01); *G05D 1/0212* (2013.01); *G05D 1/0289* (2013.01); *H04W 4/44* (2018.02);
(Continued)

(58) Field of Classification Search
None
See application file for complete search history.

(56) References Cited

U.S. PATENT DOCUMENTS 8,880,272 B1 * 11/2014 Ferguson .............. B60W 30/10
701/26
9,349,285 B1 * 5/2016 Fowe ........................ G08G 1/00
(Continued)

FOREIGN PATENT DOCUMENTS

DE    10 2006 038 018 A1    2/2008
DE    10 2008 003 666 A1    7/2009
(Continued)

OTHER PUBLICATIONS

Translation of International Preliminary Report on Patentability dated May 17, 2018 from International Patent Application No. PCT/EP2016/077034, 7 pages.
(Continued)

*Primary Examiner* — Kaveh Abrishamkar
(74) *Attorney, Agent, or Firm* — Staas & Halsey LLP

(57) ABSTRACT

A trajectory of a motor vehicle relative to a vehicle-external reference system is determined during a movement of the motor vehicle along a track of the motor vehicle. The determined trajectory of the motor vehicle is transmitted to a vehicle-external central track information collection device, and track information is determined based on the transmitted trajectory by the track information collection device and provided to at least one additional motor vehicle.

20 Claims, 2 Drawing Sheets

(51) Int. Cl.
*G05D 1/02* (2020.01)
*H04W 88/02* (2009.01)

(52) U.S. Cl.
CPC ..... *B60W 2540/18* (2013.01); *B60W 2540/30* (2013.01); *B60W 2554/00* (2020.02); *B60W 2554/80* (2020.02); *B60W 2555/20* (2020.02); *B60W 2556/55* (2020.02); *B60W 2556/65* (2020.02); *G05D 2201/0213* (2013.01); *H04W 88/02* (2013.01)

(56) References Cited

U.S. PATENT DOCUMENTS

| | | | |
|---|---|---|---|
| 10,017,039 B1* | 7/2018 | Colavincenzo | B60W 20/00 |
| 10,281,927 B2* | 5/2019 | Switkes | G08G 1/22 |
| 10,520,952 B1* | 12/2019 | Luckevich | G05D 1/0293 |
| 2001/0023380 A1 | 9/2001 | Mizutani | |
| 2006/0217884 A1 | 9/2006 | Adachi | |
| 2014/0129073 A1 | 5/2014 | Ferguson | |
| 2014/0324334 A1 | 10/2014 | Nakashima et al. | |
| 2017/0227972 A1* | 8/2017 | Sabau | G08G 1/22 |
| 2017/0270785 A1* | 9/2017 | Umehara | G08G 1/08 |
| 2017/0293296 A1* | 10/2017 | Stenneth | G01C 21/3438 |
| 2017/0343369 A1* | 11/2017 | Anastassov | G01C 21/3492 |
| 2017/0343370 A1* | 11/2017 | Giurgiu | G08G 1/0133 |
| 2018/0024562 A1* | 1/2018 | Bellaiche | B60W 30/12 701/26 |
| 2018/0082591 A1* | 3/2018 | Pandy | B60W 30/09 |

FOREIGN PATENT DOCUMENTS

| | | |
|---|---|---|
| DE | 10 2013 012 324 A1 | 1/2015 |
| DE | 10 2013 019 112 A1 | 5/2015 |
| DE | 10 2015 014 651.3 | 11/2015 |
| WO | PCT/EP2016/077034 | 11/2016 |

OTHER PUBLICATIONS

International Search Report dated Feb. 13, 2017 from International Patent Application No. PCT/EP2016/077034, 3 pages.

Chinese Office Action dated Dec. 20, 2018 from Chinese Patent Application No. 201680066091.6, with English translation of summary of Examiner's comments, 6 pages.

Machine Translation of German Office Action dated Sep. 12, 2016, from German Patent Application No. 10 2015 014 651.3, previously submitted on May 14, 2018 (17 pages in total including both the original and machine-translated German Office Action).

* cited by examiner

METHOD FOR PROVIDING TRACK INFORMATION ON A VEHICLE TRACK, AND SYSTEM

CROSS REFERENCE TO RELATED APPLICATIONS

This application is a U.S. national stage of International Application No. PCT/EP2016/077034, filed on Nov. 9, 2016. The International Application claims the priority benefit of German Application 10 2015 014 651.3 filed on Nov. 12, 2015. Both the International Application and the German Application are incorporated by reference herein in their entirety.

BACKGROUND

Described herein is a method for providing an item of lane information relating to a lane of a motor vehicle. A driving trajectory of the motor vehicle with respect to a reference system outside the vehicle is determined while the motor vehicle is moved in the lane. Also described herein is a system having at least one motor vehicle for determining a driving trajectory of the motor vehicle in a lane.

A method for providing an item of lane information relating to a lane is described in German Patent Application No. 102006038018 A1 which describes a method for providing driver assistance by generating lane information for supporting or replacing lane information from a video-based lane information device. An item of lateral lane information received from the lane information device is replaced on the basis of navigation-system-based lateral lane information received directly from third-party vehicles traveling in front in dependence on determined reliability parameters.

U.S. Patent Application Publication No. 2014/0324334 A1 describes an information processing system and a corresponding method. In this case, information relating to route guidance is captured by a first vehicle and is transmitted to a central server. The information collected by the central server is made available to a second vehicle which carries out the route guidance on the basis of the information. In this case, route information relating to the second vehicle can be compared with a trajectory of the first vehicle. Provision may also be made for corresponding data records to be transmitted from a plurality of vehicles to the central server, in which case a data record is selected in the server or in the vehicle and is used to extract information for the route guidance.

U.S. Patent Application Publication No. 2001/0023380 A1 describes an apparatus for automatically controlling a vehicle. In this case, a controllable steering unit and a controllable drive can be used to control the vehicle along a predefined path. Corresponding path information can include a position, an orientation and a speed of the vehicle and can be collected by corresponding capture devices of the vehicle. A path, along which the vehicle is intended to be controlled, can be calculated on the basis of this path information. The path information can be provided, for instance, by a server device.

U.S. Patent Application Publication No. 2006/0217884 A1 describes a method and an apparatus for transmitting a trajectory of a vehicle to a server device. In this case, the trajectory is determined in the vehicle using corresponding capture devices, for instance for determining a position of the vehicle, in which case segment-by-segment scanning of the route covered is provided. A segment length may be dependent on the course of a road. In order to keep the volume of data to be transmitted as small as possible, coding of the transmitted data in the vehicle and decoding of the transmitted data in the server are provided.

German Patent Application No. 102013012324 A1 describes a method for automatically finding a route for an ego vehicle. Position indications of a vehicle traveling in front are received and a route is constructed on the basis of the received position indications.

German Patent Application No. 102013019112 A1 describes a method for operating a driver assistance system for a motor vehicle. The driver assistance system includes a monitoring device which is designed to receive data packets containing position data relating to third-party vehicles traveling on a road from a receiving unit. A lane course for a lane of the road is determined on the basis of the position data contained in the data packets. A control signal for assisting with the guidance of the motor vehicle is output on the basis of the lane course.

SUMMARY

Described herein is a method and a system which can be used to increase the safety in road traffic.

In a method according to the disclosure, an item of lane information relating to a lane of a respective motor vehicle is provided. A driving trajectory of the motor vehicle with respect to a reference system outside the vehicle is determined while the motor vehicle is moved in the lane. An inventive concept of the disclosure can be seen in the fact that a plurality of driving trajectories of a plurality of motor vehicles are determined and these driving trajectories are transmitted to a central lane information collection device, for example a static lane information collection device, outside the vehicle. The lane information determined at least on the basis of the transmitted driving trajectories is made available at least to one further motor vehicle by the lane information collection device.

The disclosure is based on the knowledge that the lane information can be provided more accurately and with greater availability if it is determined by the central lane information collection device and is then made available to the further motor vehicle in this way. The further motor vehicle can then be operated more safely with the more accurate and more frequently available lane information and the safety in road traffic is consequently increased.

Provision is made for the motor vehicle to be moved in the lane, for example under the manual control of a driver of the motor vehicle. The driving trajectory of the motor vehicle in the lane, which is driven by the driver for example, is recorded with respect to the reference system outside the vehicle. As a result, the driving trajectory in the lane can then be reliably determined. For example, the driving trajectory can be reliably determined thereby in the case of complex traffic management or in the case of a complex lane course. The driving trajectory can therefore indicate the lane course at bends, widened lanes or missing lane markings. In the case of the examples, the detection of the exact lane course by using assistance systems of the motor vehicle is often inaccurate and sometimes even impossible. As a result of the fact that the lane is driven along manually by the driver for example, the driving trajectory selected by the driver can be used as the lane information. A left-hand lane boundary and a right-hand lane boundary of the lane can then be determined on the basis of the lane information, and the lane information includes, for example, an item of information relevant to the lateral guidance for the lateral movement of the further motor vehicle in the lane.

The determined driving trajectory is then transmitted to the central lane information collection device outside the vehicle. The central lane information collection device is in the form of an external server, for example, and is static, for example. This means that the central lane information collection device is immovable, for example, and is not in the form of a motor vehicle. The advantage of the central lane information collection device is that a plurality of driving trajectories for the lane of a plurality of motor vehicles are collected there. The driving trajectories can also be held in the lane information collection device over a period of several days, for example.

The lane information relating to the lane is then determined on the basis of the plurality of driving trajectories. As a result, the lane information can be generated in a particularly accurate manner. The determined lane information is then made available to further motor vehicles by the lane information collection device. The provision of information to the further motor vehicles can be transmitted, for example, following a request from the further motor vehicles or for example automatically on the basis of their geographical position and/or their most likely travel route. Furthermore, the lane information transmitted to the at least one further motor vehicle can then be used for the lateral guidance control of the further motor vehicle. The further motor vehicle is then, for example, operated at least in a semi-autonomous manner, for example in a completely autonomous manner.

The lane information may have a position stamp which is referenced either on the basis of a global coordinate system, for example WGS (World Geodetic System), or on the basis of a global coordinate system of a map, for example a UTM (Universal Transverse Mercator) coordinate system. The lane information includes a direction of travel of the lane, for example.

For example, "in-the-loop" system optimization can be carried out as a result of the driving trajectory of the motor vehicle being determined while the motor vehicle is moved in the lane by the driver, for example. This means that a driver assistance system of the motor vehicle is operated at the same time, and the driving trajectory which is envisaged by the driver assistance system and is to be driven along is compared with the driving trajectory actually driven along by the driver. As a result, discrepancies between the system behavior and the driver's behavior can be collected and analyzed.

Provision is made for the plurality of driving trajectories to be transmitted to the lane information collection device, and for the lane information to be determined on the basis of the plurality of driving trajectories. The plurality of motor vehicles are therefore in the form of a vehicle fleet, for example, and the plurality of driving trajectories are therefore also in the form of vehicle fleet data. As a result of the plurality of driving trajectories being present in the collection device, the lane information can be determined more accurately than if only the driving trajectory of a single vehicle were present. Incorrect driving trajectories can be determined, for example, and can be excluded from the determination of the lane information. Furthermore, the lane information is continuously adapted, for example, as a result. The lane information is then consistently up-to-date as a result, for example if lane guidance for the lane changes, for example as a result of roadworks or environmental influences which can damage the lane, for example, such that the lane is managed differently than originally intended. The lane information is therefore determined, for example, on the basis of driving trajectories collected over a predetermined period. This is not possible in known methods if the lane information is determined in a vehicle traveling in front.

Driving trajectories are therefore collected by using vehicles in a vehicle fleet to which the motor vehicle also belongs and are collected and processed at a central location, that is to say the central lane information collection device outside the vehicle, in order to provide the lane information. The lane information is then made available to the at least one further motor vehicle for assisting with at least the lateral guidance in the lane.

Provision is made for the driving trajectory of the motor vehicle in the lane to be determined by a localization unit of the motor vehicle, for example. The localization unit can use sensor data and/or map data to improve localization, for example satellite-based localization. The localization unit of the motor vehicle may include, for example, a global navigation satellite system (GNSS). The reference system outside the vehicle may be based, for example, on the WGS 84 (World Geodetic System 1984). The global navigation satellite system may include, for example, a receiver for GPS (Global Positioning System), Glonass, Galileo and/or Beidou. The localization unit may be in the form of a navigation unit, for example. However, the localization unit may also include environmental sensors of the motor vehicle. The environmental sensors can detect, for example, landmarks in an area surrounding the motor vehicle in the lane. The current position of the motor vehicle can then be improved on the basis of the landmarks. Traffic signs, for example, come into consideration as landmarks. The environmental sensors may be in the form of a camera, ultrasound, radar or a laser scanner, for example. It is therefore advantageous that the driving trajectory of the motor vehicle can be determined more accurately by the localization unit.

Provision is also made for the driving trajectory to be determined on the basis of a steering angle profile of the motor vehicle, for example. The steering angle profile of the motor vehicle while the motor vehicle is moved in the lane can be determined by using a steering angle sensor of the motor vehicle, for example. The steering angle profile has the advantage that it is determined only in the motor vehicle and can therefore be determined independently of an environmental sensor of the motor vehicle or a global navigation satellite system. As a result, the steering angle profile can be used, for example, for a detailed description of the driving trajectory.

Provision is made for a reliability value of the driving trajectory to be determined on the basis of sensor data from the motor vehicle, for example in the motor vehicle, when determining the driving trajectory, and for the lane information to be determined on the basis of the reliability value. The sensor data may provide information on a position accuracy of the driving trajectory in the lane at the time at which the driving trajectory is captured, for example. The driving trajectory is determined in a more reliable manner as a result.

Another embodiment provides for one driving trajectory of the plurality of driving trajectories to be respectively compared with the remaining driving trajectories of the plurality of driving trajectories, and for a further reliability value of the respective driving trajectory to be determined on the basis of the comparison. Comparing the driving trajectories with one another makes it possible to determine gross outliers of the driving trajectories, for example. A driving trajectory can be in the form of a gross outlier, for example, if there is incorrect position determination in the reference system outside the vehicle or else if an environmental sensor of the motor vehicle or a steering angle sensor of the motor vehicle is operated incorrectly during the capture of the driving trajectory by the motor vehicle. The consideration of an incorrect driving trajectory when determining the lane information would result in the lane information becoming inaccurate. The lane information can be generated more accurately by detecting the incorrect driving trajectory. The incorrect driving trajectory can be determined, for example, by using a RANSAC (Random Sample Consensus) algorithm inside the central lane information collection device.

Another embodiment provides for a plausibility of the lane information to be checked on the basis of a respective steering angle of the plurality of motor vehicles during movement in the lane and/or a lane marking arrangement of a road including the lane and/or a respective speed value of the plurality of motor vehicles during movement in the lane. A plausibility of the lane information can therefore be determined on the basis of the plurality of motor vehicles. Each of the motor vehicles can therefore provide information during movement in the lane in order to check the plausibility of the lane information. For example, the steering angles of the plurality of motor vehicles and/or the respective speed value of the plurality of motor vehicles can be used to check the plausibility of the lane information. Furthermore, an arrangement of the lane marking of the road can be captured by each of the motor vehicles of the plurality of motor vehicles, for example using a camera system, and can be used to check the plausibility of the lane information. On the one hand, there are various types of information for checking the plausibility of the lane information and, on the other hand, these types of information are also provided by a plurality of motor vehicles, thus also increasing the reliability of the plausibility check. This also makes it possible to determine a discrepancy between the driver's behavior and the system behavior.

Provision is made for the driving trajectory to be determined, together with an external parameter, for example a driver type of a driver of the motor vehicle and/or a weather condition in an area surrounding the motor vehicle, during movement of the motor vehicle in the lane, and for the lane information to be allocated to a lane information category of a plurality of predetermined lane information categories, an item of lane information of the respective lane information category being made available to the further motor vehicle by the lane information collection device on the basis of the situation. This makes it possible to cluster the driving trajectories for a plurality of items of lane information with different lane guidance properties on the basis of the weather condition and/or the driver type. The respective lane information can then be made available to the further motor vehicle on the basis of the situation. The situation can depend on a driver type of a driver of the further motor vehicle and/or a weather condition in an area surrounding the further motor vehicle. The lane information from the respective lane information category can also be manually selected by the further motor vehicle, for example.

Furthermore, provision may be made, for example, for the lane information to be automatically made available to the further motor vehicle on the basis of a current position of the further motor vehicle in the reference system outside the vehicle, for example the lane information is automatically made available to the further motor vehicle if the distance between the further motor vehicle and the lane is less than a distance limit value. The request from the further motor vehicle to the lane information collection device with respect to the transmission of the lane information can thus be automatically emitted by the further motor vehicle if the distance between the further motor vehicle and the lane is less than the distance limit value. Additionally or alternatively, the lane information can also be transmitted to the further motor vehicle on the basis of the most likely travel route of the further motor vehicle. It is advantageous that the further motor vehicle receives the lane information with little effort. Transmitting the lane information on the basis of the most likely travel route makes it possible to reduce the volume of data when transmitting lane information. It is then not necessary, for example, to transmit all lane information relating to the lanes from the area surrounding the motor vehicle, but rather only those items of lane information relating to the lanes which are driven along by the further motor vehicle according to a probability calculation. On the one hand, this makes it possible to speed up the transmission of the required lane information and, on the other hand, makes it possible to process the lane information further more quickly in the further motor vehicle on account of the smaller volume of data.

For example, provision may be made for the lane information to be taken into account for lateral guidance of the further motor vehicle during driving of the further motor vehicle in the lane. The motor vehicle is kept within the lane boundaries of the lane as a result of the lateral guidance or lateral movement guidance of the motor vehicle in the lane. The lane information can be taken into account, for example, by virtue of a driver assistance system in the further motor vehicle outputting a warning if crossing of the lane boundaries is imminent or has taken place. However, the further motor vehicle can also be operated at least in a semi-autonomous manner, for example in an autonomous manner. The lane information can therefore be used to autonomously move the further motor vehicle in the lane inside the lane boundaries. The lane information for the lateral guidance of the further motor vehicle is advantageous, for example, in the case of bends, widened lanes or missing lane markings of the lane. As a result, the further motor vehicle can be operated more safely.

Another embodiment provides for the further motor vehicle to be operated at least in a semi-autonomous manner, for example in an autonomous manner, with regard to a steering angle of the further motor vehicle and/or with regard to a position of the further motor vehicle in the lane, on the basis of the lane information. Provision is made, for example, for the further motor vehicle to be steered in the lane in a piloted manner. The further motor vehicle can still be accelerated or decelerated by the driver of the further motor vehicle, for example. However, there may be situations, for example, in which the driver cannot accurately discern the lane boundaries of the lane and therefore the exact course of the lane, for example in the case of poor lighting conditions or extreme weather conditions, for example a snow-covered lane or else on account of fatigue of the driver. In this case, the driver can be assisted by the autonomous steering of the further motor vehicle on the basis of the lane information during operation of the further motor vehicle. This again increases the safety of the further motor vehicle.

The disclosure also relates to a system having at least one motor vehicle for determining a driving trajectory of the motor vehicle in a lane. As an inventive concept of the disclosure, provision is made for the system to include a central lane information collection device which is designed to receive a plurality of determined driving trajectories of a plurality of motor vehicles, to generate an item of lane information relating to the lane on the basis of the plurality of driving trajectories and to provide the generated lane information for a further motor vehicle.

The example embodiments and their advantages presented with respect to the method according to the disclosure accordingly apply to the system according to the disclosure.

The features and combinations of features that are disclosed in the description above and also the features and combinations of features that are disclosed in the description of the drawings below and/or are shown in the drawings alone can be used not only in the respectively indicated combination but also in other combinations or on their own without departing from the scope of the disclosure. Therefore, embodiments of the disclosure that are not explicitly shown and explained in the drawings, but emanate and are producible from the explained embodiments by virtue of self-contained combinations of features, are also intended to be regarded as included and disclosed.

BRIEF DESCRIPTION OF THE DRAWINGS

These and other aspects and advantages will become more apparent and more readily appreciated from the following description of the example embodiments of the disclosure, taken in conjunction with the accompanying drawings, in which.

DETAILED DESCRIPTION

Reference will now be made to example embodiments which are illustrated in the accompanying drawings, wherein identical or functionally identical elements are provided with the same reference symbols.

Figure 1:
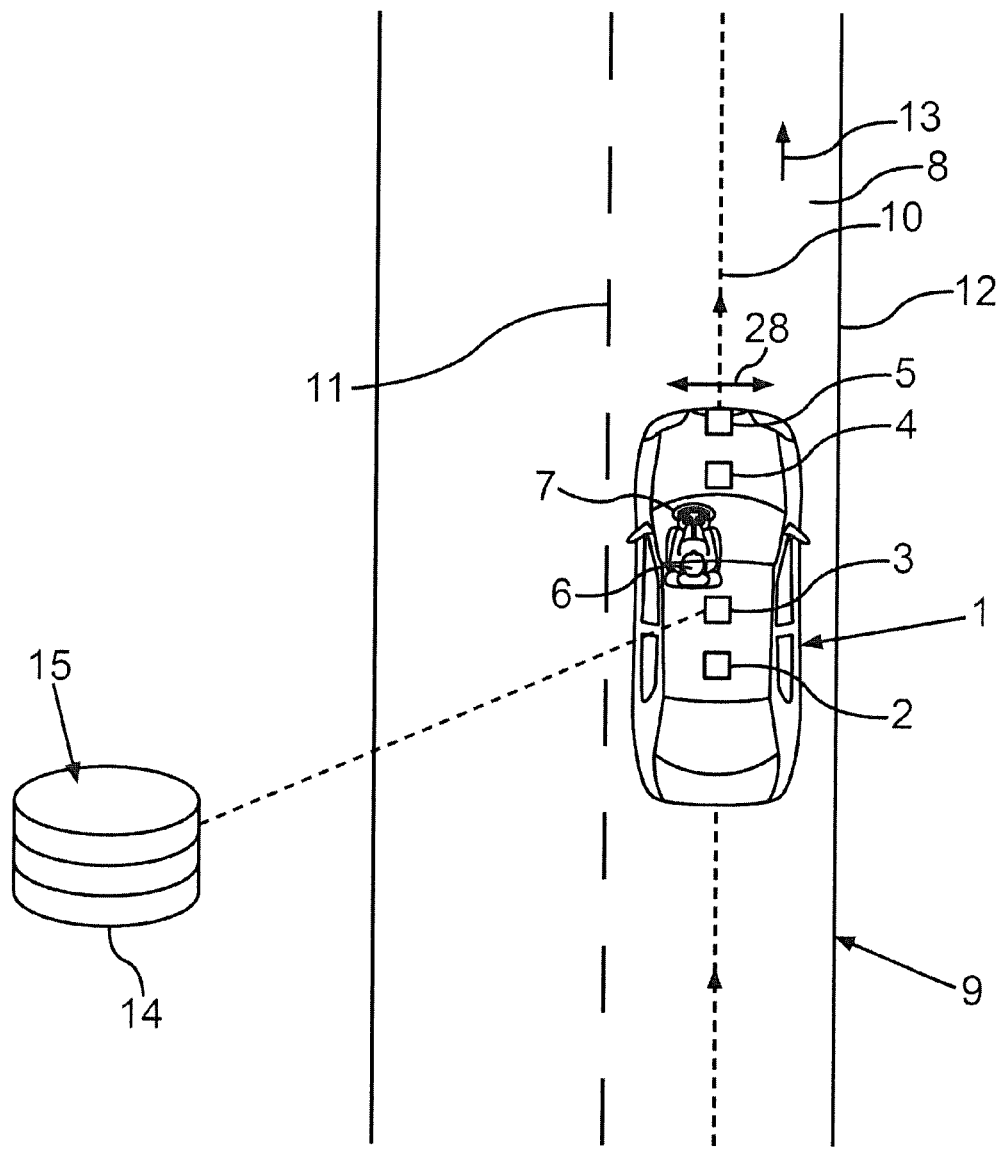
FIG. 1 is a schematic plan view of an example embodiment of a motor vehicle according to the disclosure in a lane.

FIG. 1 schematically illustrates a plan view of a motor vehicle 1. The motor vehicle 1 may include a localization unit 2, a communication unit 3, a steering angle sensor 4 and an environment capture system 5. The localization unit 2 can be used to determine a position of the motor vehicle 1 in a reference system outside the vehicle. The reference system outside the vehicle may be in the form of WGS 84, for example. The localization unit 2 therefore includes a receiver of a global navigation satellite system, for example. The communication unit 3 is designed to transmit information to a device outside the vehicle, for example an external server. The information is transmitted, for example, wirelessly, for example using a mobile data transmission method, for example according to a 3G or 4G standard. The steering angle sensor 4 is designed to capture a current steering angle of the motor vehicle 1 and to, for example, determine a steering angle profile of the motor vehicle 1. The environment capture system 5 can capture landmarks in the area surrounding the motor vehicle 1, for example. The landmarks may be, for example, in the form of a traffic sign or a diverse striking object.

According to the exemplary embodiment, the motor vehicle 1 is steered by a driver 6. The driver 6 can carry out the steering, for example using a steering wheel 7 of the motor vehicle 1.

The motor vehicle 1 is moved in a lane 8 of a road 9. The driver 6 moves the motor vehicle 1 along a driving trajectory 10 of the motor vehicle 1. The lane 8 has a left-hand lane boundary 11 and a right-hand lane boundary 12. The lane 8 also has an intended control direction of travel 13. The motor vehicle 1 is steered by the driver 6 in the control direction of travel 13 in the lane 8, for example, in such a manner that the driving trajectory 10 is within the left-hand lane boundary 11 and the right-hand lane boundary 12.

The driving trajectory 10 of the motor vehicle 1 is determined in the reference system outside the vehicle and is transmitted to a central lane information collection device 14 outside the vehicle by using the communication unit 3. The lane information collection device 14 is, for example, in the form of an external server having a database and an evaluation unit. For example, the lane information collection device 14 is static and is not in the form of a movable object, for example a motor vehicle. The lane information collection device 14 is designed to collect a plurality of driving trajectories 10 of different motor vehicles. An item of lane information 15 relating to the lane 8, for example an item of information 28 relevant to the lateral guidance, is generated in the lane information collection device 14 on the basis of the driving trajectory 10. The lane information 15 includes information relating to the lane 8, for example a part of the lane 8 which can be safely driven along. The lane information 15 can therefore provide, for example, an ideal driving trajectory for the lane 8, in which the left-hand lane boundary 11 and the right-hand lane boundary 12 are not crossed over.

Figure 2:
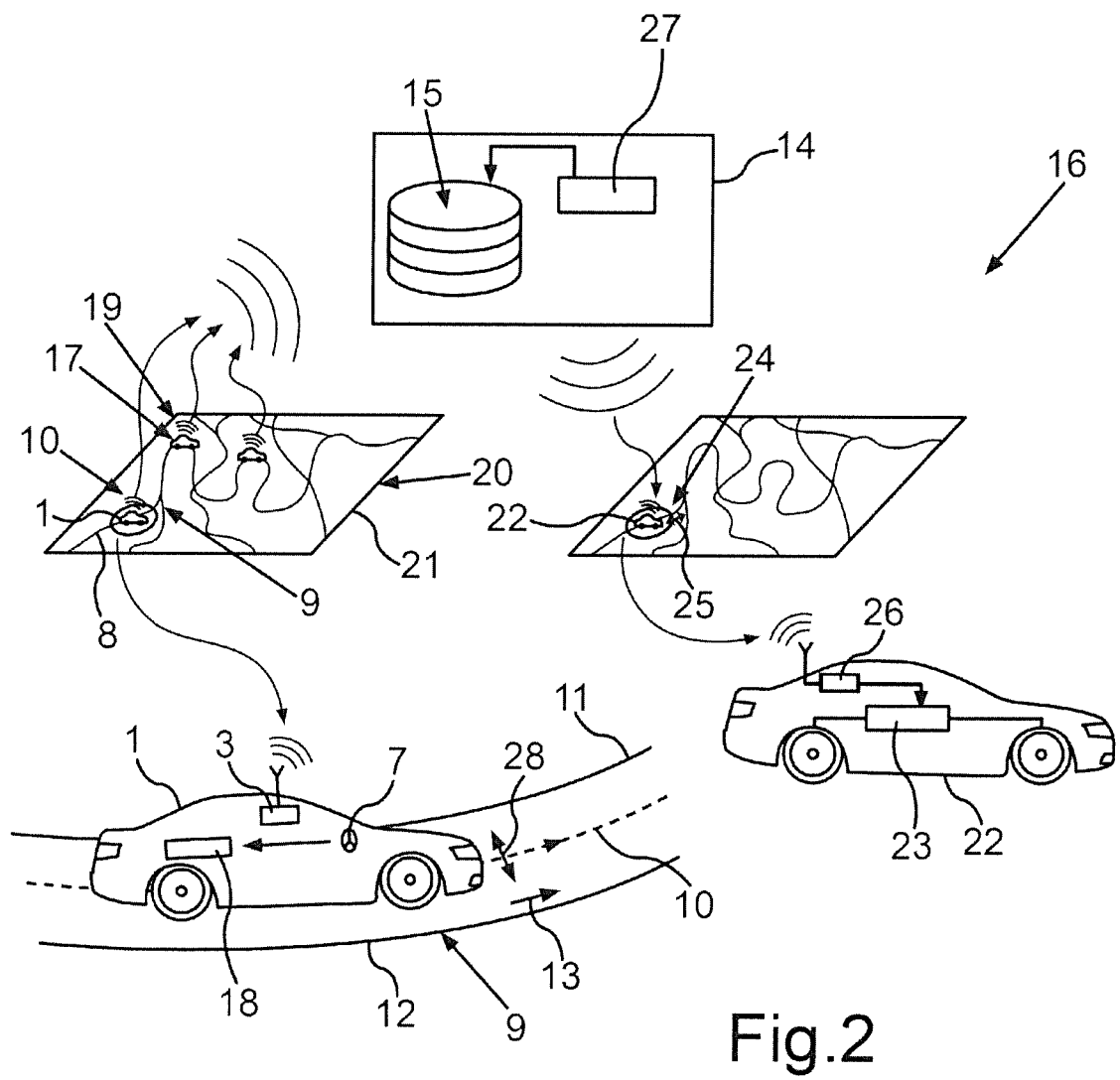
FIG. 2 is a schematic illustration of a system having a motor vehicle, a central lane information collection device and a further motor vehicle.

FIG. 2 shows a system 16. The system 16 may include the motor vehicle 1 and a plurality of motor vehicles 17. The motor vehicle 1 has a lateral guidance system 18 which is controlled by the driver 6 using the steering wheel 7. The driving trajectory 10 in the lane 8 is determined on the basis of the lateral guidance system 18. Furthermore, a plurality of driving trajectories 19 for the lane 8 are determined by using the plurality of motor vehicles 17.

The driving trajectory 10 and the plurality of driving trajectories 19 are determined with respect to a reference system 20 outside the vehicle. The driving trajectory 10 and the plurality of driving trajectories 19 are then present in the reference system 20 outside the vehicle with the indication of a global geographical position. The reference system 20 may be in the form of WGS 84, for example. The driving trajectory 10 and/or the plurality of driving trajectories 19 can be transferred to a map 21, for example, on the basis of the reference system 20.

The driving trajectory 10 and the plurality of driving trajectories 19 are transmitted to the lane information collection device 14. The driving trajectory 10 then includes, for example, information such as the position of the motor vehicle 1, a desired course and a steering angle profile of the motor vehicle 1. The steering angle profile can be used to determine how the driver 6 has turned the steering wheel 7 at a respective position of the motor vehicle 1.

The lane information 15 relating to the lane 8 is then determined by using the driving trajectory 10 transmitted to the lane information collection device 14 and the plurality of driving trajectories 19. The lane information 15 then provides, as it were, an ideal driving trajectory inside the left-hand lane boundary 11 and the right-hand lane boundary 12. The lane information 15 is determined on the basis of the driving trajectory 10 and the plurality of driving trajectories 19. This makes it possible to determine an outlier or an incorrect driving trajectory. Furthermore, the lane information 15 can be determined more accurately as a result.

The lane information 15 is then transmitted from the lane information collection device 14 to a further motor vehicle 22. The further motor vehicle 22 is situated in the lane 8, for example. A lateral guidance system 23 of the further motor vehicle 22 can be assisted on the basis of the lane information 15. The lateral guidance system 23 keeps the further motor vehicle 22 in the lane 8, that is to say inside the left-hand lane boundary 11 and the right-hand lane boundary 12. The further motor vehicle 22 can be operated at least in a semi-autonomous manner, for example. The further motor vehicle 22 can thus be automatically steered by the lateral guidance system 23 on the basis of the lane information 15.

The lane information 15 can be provided for the further motor vehicle 22 on the basis of a current position 24 of the further motor vehicle 22 in the reference system 20 outside the vehicle, for example. The lane information 15 is automatically made available to the further motor vehicle 22, for example, if a distance 25 between the further motor vehicle 22 and the lane 8 is less than a distance limit value. Additionally or alternatively, the lane information 15 can be made available to the further motor vehicle 22 on the basis of a predicted most likely travel route of the motor vehicle 22. The further motor vehicle 22 has a further communication unit 26 for receiving the lane information 15.

Lateral guidance of the further motor vehicle 22 in the lane 8 can be carried out more reliably and more accurately as a result of the provision of the lane information 15 for the further motor vehicle 22, which lane information was accurately determined in the lane information collection device 14 on the basis of the plurality of driving trajectories 19 and the driving trajectory 10. As a result, the further motor vehicle 22 can be operated more safely, for example during autonomous operation. The lane information 15 is determined, for example, by using an evaluation unit 27 or a data processing unit of the central lane information collection device 14.

For example, the method for operating the further motor vehicle 22 is helpful if the lane 8 has humps or missing lane markings. A lateral guidance system 23 of the further motor vehicle 22, which is based on an environment capture device of the further motor vehicle 22, is then supported or supplemented with the lane information 15, for example.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method, comprising:
receiving, by a central lane information collection device, respective driving trajectories transmitted from a plurality of motor vehicles with respect to a reference system outside a first motor vehicle during movement of the first motor vehicle in a lane, the plurality of motor vehicles including the first motor vehicle;
receiving, as an external parameter, by the central lane information collection device, a driver type of a driver of each of the plurality of motor vehicles together with the driving trajectories;
allocating, by the central lane information collection device, lane information to a lane information category among a plurality of predetermined lane information categories;
clustering, by the central lane information collection device, the driving trajectories with respect to a plurality of items of lane information having different lane guidance properties based on the driver type of the driver of each of the plurality of motor vehicles;
determining, by the central lane information collection device, an item of lane information from a respective lane information category and from the plurality of items of lane information, based on the driving trajectories and on a situation of a second motor vehicle;
when a distance between the second motor vehicle and the lane is less than a predetermined distance value and a most likely travel route of the second motor vehicle, determined according to a probability calculation, includes the lane, transmitting, by the central lane information collection device, the determined item of lane information to the second motor vehicle,
wherein the central lane information collection device is a stationary server, located remotely from the plurality of motor vehicles.

2. The method as claimed in claim 1, further comprising determining the item of lane information based on a reliability value of the driving trajectory of the first motor vehicle obtained from sensor data of the first motor vehicle indicating a position accuracy of the driving trajectory of the first motor vehicle.

3. The method as claimed in claim 1, further comprising receiving, as another external parameter, a weather condition in an area surrounding the first motor vehicle during movement of the first motor vehicle, together with the driving trajectory of the first motor vehicle,
wherein the clustering the plurality of driving trajectories with respect to the plurality of items of lane information having different lane guidance properties is further based on the weather condition in the area surrounding the first motor vehicle during movement of the first motor vehicle.

4. The method as claimed in claim 1, wherein the transmitting the determined item of lane information to the second motor vehicle is performed automatically by the central lane information collection device based on a current position of the second motor vehicle in the reference system outside the first motor vehicle.

5. The method as claimed in claim 1, wherein the transmitting the determined item of lane information to the second motor vehicle is performed in response to a request from the second motor vehicle when the distance between the second motor vehicle and the lane is less than the predetermined distance value and the most likely travel route of the second motor vehicle includes the lane.

6. The method as claimed in claim 1, wherein the determined item of lane information is for guiding the second motor vehicle laterally during travel of the second motor vehicle in the lane.

7. A central lane information collection device, comprising:
a memory to store machine readable instructions; and
at least one processor configured to execute the machine readable instructions stored in the memory to:
receive respective driving trajectories transmitted from a plurality of motor vehicles with respect to a reference system outside a first motor vehicle during movement of first motor vehicle in a lane, the plurality of motor vehicles including the first motor vehicle, and
receive, as an external parameter, a driver type of a driver of each of the plurality of motor vehicles together the driving trajectories,
allocate lane information to a lane information category among a plurality of predetermined lane information categories, cluster the driving trajectories with respect to a plurality of items of lane information having different lane guidance properties based on the driver type of the driver of each of the plurality of motor vehicles, generate an item of lane information from a respective lane information category and from the plurality of items of lane information, based on the driving trajectories and on a situation of a second motor vehicle, and when a distance between the second motor vehicle and the lane is less than a predetermined distance value and a most likely travel route of the second motor vehicle, determined according to a probability calculation, includes the lane, transmit the generated item of lane information to the second motor vehicle, wherein the central lane information collection device is a stationary server, located remotely from the plurality of motor vehicles.

8. The central lane information collection device as claimed in claim 7, wherein the generated item of lane information is to control lateral guidance of the second motor vehicle in the lane.

9. The central lane information collection device as claimed in claim 7, wherein the at least one processor is configured to store the driving trajectories in the memory for a predetermined period of time.

10. The central lane information collection device as claimed in claim 7, wherein the at least one processor is configured to transmit the generated item of lane information to the second motor vehicle in response to a request from the second motor vehicle for the item of lane information.

11. The central lane information collection device as claimed in claim 7, wherein the at least one processor is configured to automatically transmit the generated item of lane information to the second motor vehicle based on a current position of the second motor vehicle in the reference system outside the first motor vehicle.

12. The central lane information collection device as claimed in claim 7, wherein the situation of the second motor vehicle is determined based on at least one of a driver type of a driver of the second motor vehicle or a weather condition in an area surrounding the second motor vehicle.

13. The central lane information collection device as claimed in claim 7, wherein the generated item of lane information includes at least one of a direction of travel of the lane or position information of the lane referenced in a predetermined coordinate system.

14. The central lane information collection device as claimed in claim 7, wherein the plurality of motor vehicles and the second motor vehicle belong to a same vehicle fleet.

15. The central lane information collection device as claimed in claim 7, wherein the at least one processor is configured to compare the driving trajectories with one another to determine whether an outlier driving trajectory exists among the driving trajectories using a random sample consensus algorithm.

16. The central lane information collection device as claimed in claim 7, wherein the at least one processor is configured to determine whether an item of lane information is valid based on at least one of a respective steering angle of the plurality of motor vehicles during movement in the lane, a lane marking arrangement of a road including the lane, or a respective speed value of the plurality of motor vehicles during movement in the lane.

17. A motor vehicle, comprising:
a chassis;
a wireless transceiver:
to transmit to a central lane information collection device, during movement of the motor vehicle in a lane, a driving trajectory of the motor vehicle determined with respect to a reference system outside the motor vehicle,
to transmit to the central lane information collection device, as an external parameter, a driver type of the driver of the motor vehicle, wherein the driving trajectory of the motor vehicle is clustered by the central lane information collection device with other driving trajectories from other motor vehicles based on a plurality of items of lane information with different lane guidance properties and based on a driver type of a driver of each of the other motor vehicles and the driver type of the driver of the motor vehicle, for providing an item of lane information from a lane information category to another motor vehicle based on a driver type of a driver of the another motor vehicle, and
to receive, from the central lane information collection device, another item of lane information regarding the lane based on the driver type of the driver of the motor vehicle for guiding the motor vehicle in the lane, when a distance between the motor vehicle and the lane is less than a predetermined distance value and a most likely travel route of the motor vehicle, determined according to a probability calculation, includes the lane; and
a lateral guidance system to guide the motor vehicle in the lane based on the another item of lane information received from the central lane information collection device,
wherein the central lane information collection device is a stationary server, located remotely from the plurality of motor vehicles.

18. The motor vehicle as claimed in claim 17, further comprising:
a sensor to capture a steering angle of the motor angle and to determine a steering angle profile of the motor vehicle basted on the captured steering angle; and
a localization unit to determine the driving trajectory of the motor vehicle in the lane based on the steering angle profile.

19. The motor vehicle as claimed in claim 17, wherein the lateral guidance system guides the motor vehicle in at least a semi-autonomous manner with regard to at least one of a steering angle of the motor vehicle or a position of the motor vehicle in the lane, based on the another item of lane information.

20. The motor vehicle as claimed in claim 17, wherein the wireless transceiver receives the another item of lane information from the central lane information collection device at a time before the motor vehicle is positioned in the lane, in response to a request transmitted by the wireless transceiver to the central lane information collection device for the another item of lane information or is automatically received from the central lane information collection device based on a current position of the motor vehicle in the reference system outside the motor vehicle.

* * * * *

UNITED STATES PATENT AND TRADEMARK OFFICE
CERTIFICATE OF CORRECTION

PATENT NO. : 10,814,872 B2
APPLICATION NO. : 15/775691
DATED : October 27, 2020
INVENTOR(S) : Nikoletta Sofra et al.

Page 1 of 1

It is certified that error appears in the above-identified patent and that said Letters Patent is hereby corrected as shown below:

In the Claims

Column 12, Line 45 (approx.), In Claim 18, delete "basted" and insert -- based --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*